Dec. 2, 1941.  C. A. WEISEL  2,264,466
ANTISKID DEVICE FOR VEHICLES
Filed Dec. 23, 1940   4 Sheets-Sheet 1
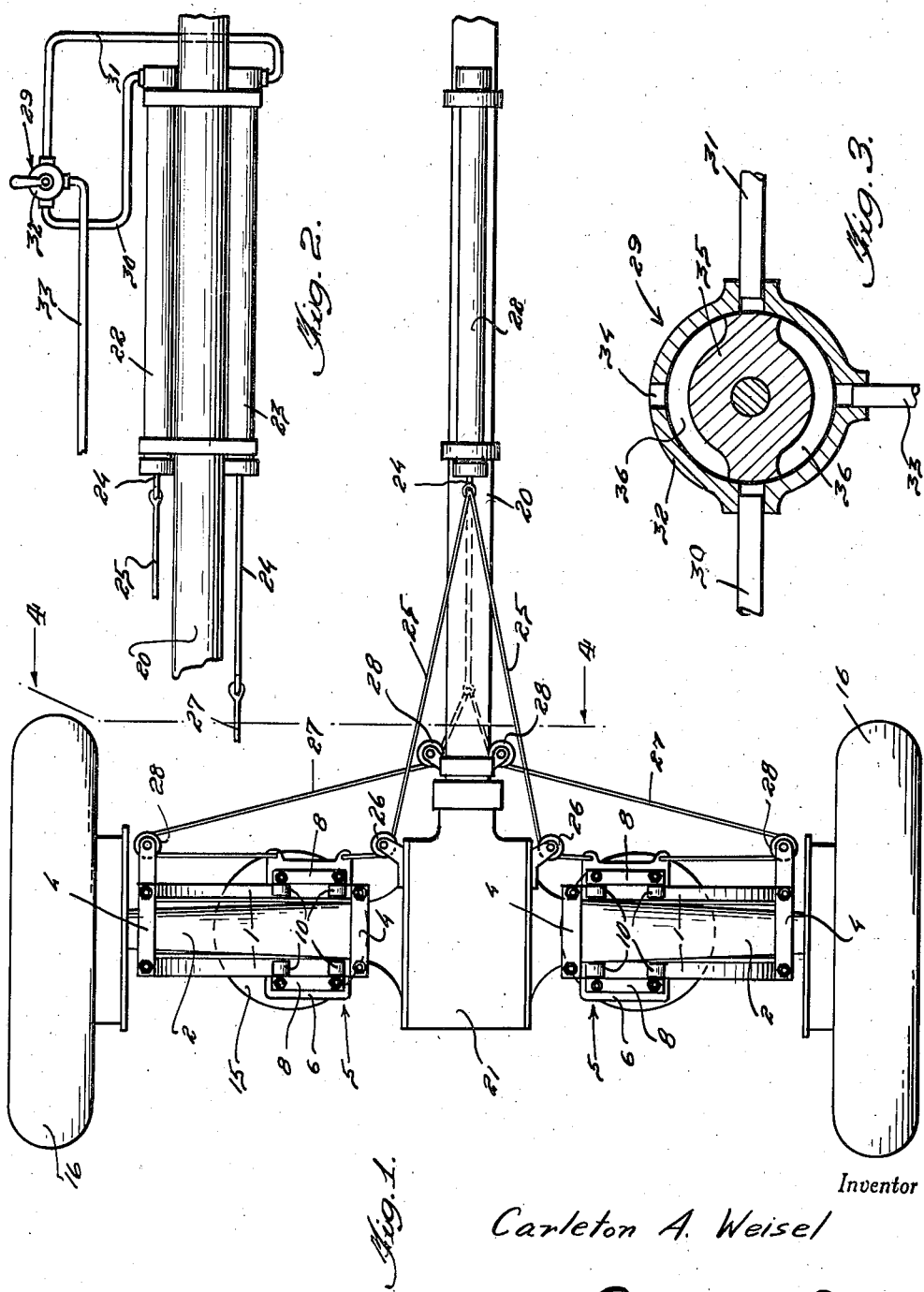
Inventor
Carleton A. Weisel
By Clarence A. O'Brien
Attorney Dec. 2, 1941.   C. A. WEISEL   2,264,466
ANTISKID DEVICE FOR VEHICLES
Filed Dec. 23, 1940   4 Sheets-Sheet 2

Inventor
Carleton A Weisel
By Clarence A O'Brien
Attorney

Inventor
Carleton A. Weisel
By Clarence A. O'Brien
Attorney

Dec. 2, 1941.    C. A. WEISEL    2,264,466
ANTISKID DEVICE FOR VEHICLES
Filed Dec. 23, 1940    4 Sheets-Sheet 4

Inventor
Carleton A. Weisel
By Clarence A. O'Brien
Attorney

Patented Dec. 2, 1941

2,264,466

UNITED STATES PATENT OFFICE 2,264,466

ANTISKID DEVICE FOR VEHICLES

Carleton A. Weisel, Hillsdale, Mich.

Application December 23, 1940, Serial No. 371,421

6 Claims. (Cl. 188—4)

The present invention relates to new and useful improvements in antiskid devices for vehicles and has for its primary object to provide, in a manner as hereinafter set forth, a device of this character which may be put in and taken out of operation at any time from the operators' seat while the vehicle is in motion.

Another very important object of the invention is to provide an antiskid device of the aforementioned character embodying novel means for mounting said device for operation on the vehicle.

Still another very important object of the invention is to provide an antiskid device of the character described embodying vacuum means of a unique construction and arrangement whereby the engine of the vehicle may be utilized for moving the device to operative and inoperative position.

Other objects of the invention are to provide an antiskid device for vehicles which will be comparatively simple in construction, strong, durable, highly efficient and reliable in use, compact and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view, showing an embodiment of the present invention installed for operation on the rear axle housings, etc., of a motor vehicle.

Figure 2 is a view in side elevation of the vacuum cylinders which are mounted on the drive shaft housing, this view also showing, in plan, the control valve and pipes.

Figure 3 is a sectional view through the control valve.

Figure 4:
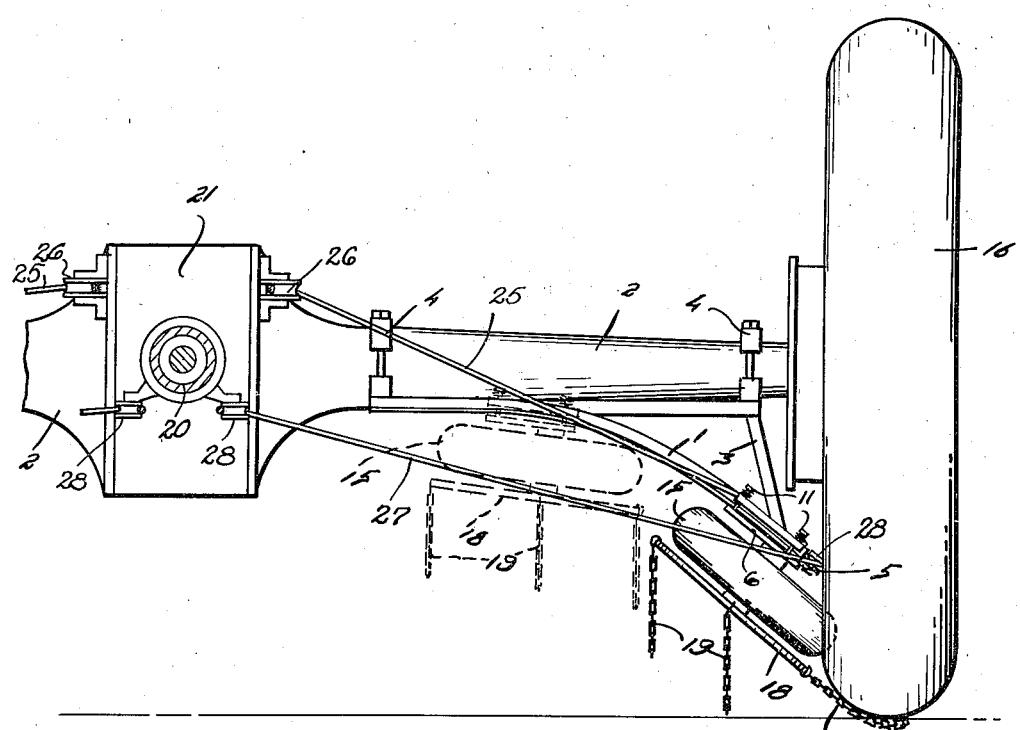
Figure 4 is a fragmentary transverse sectional view, taken on the line 4—4 of Figure 1, showing the device in operative position.
Figure 5:
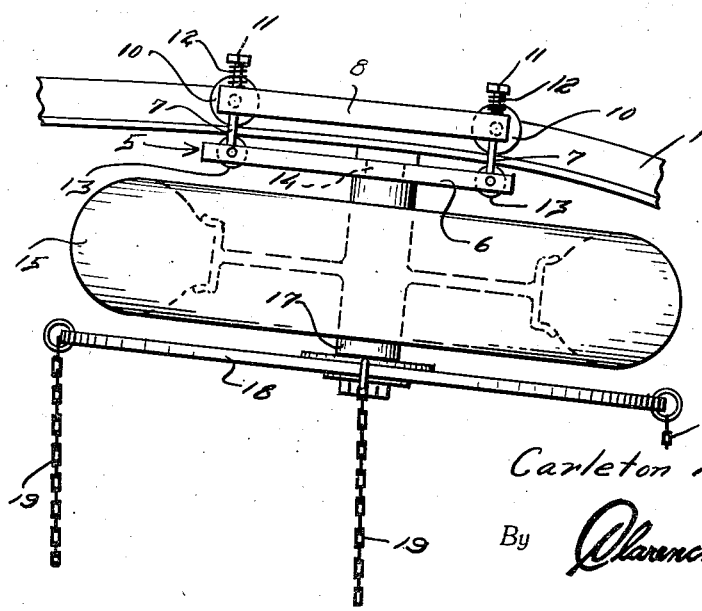
Figure 5 is a view in rear elevation, showing the device in inoperative or retracted position.
Figure 6:
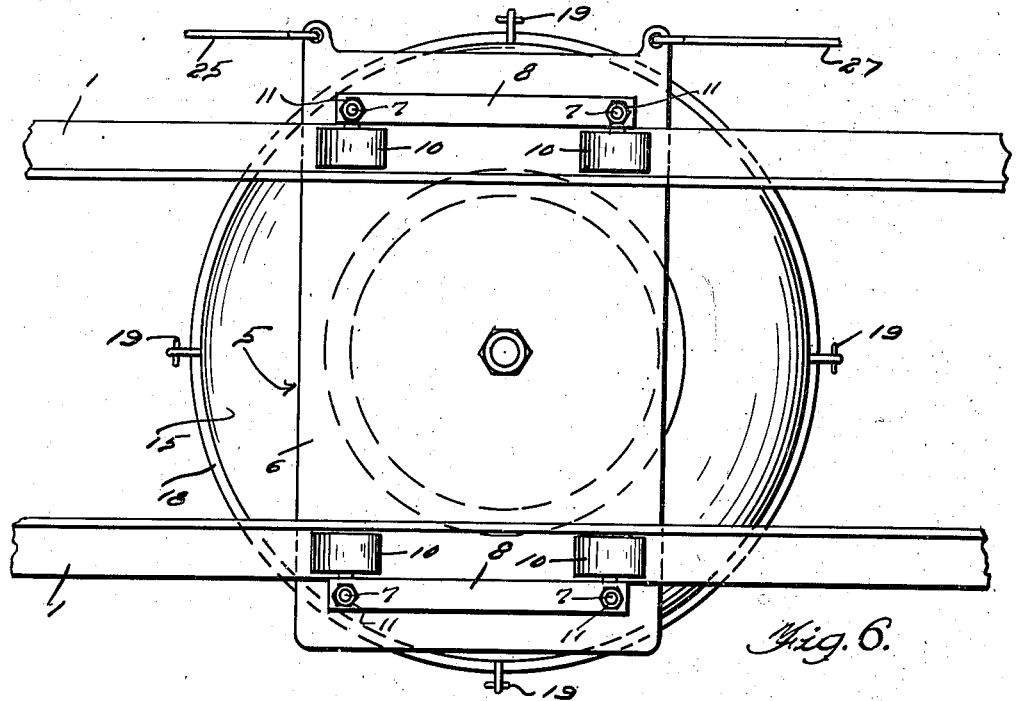
Figure 6 is a fragmentary top plan view, illustrating the non-skid device and its mounting.
Figure 7:
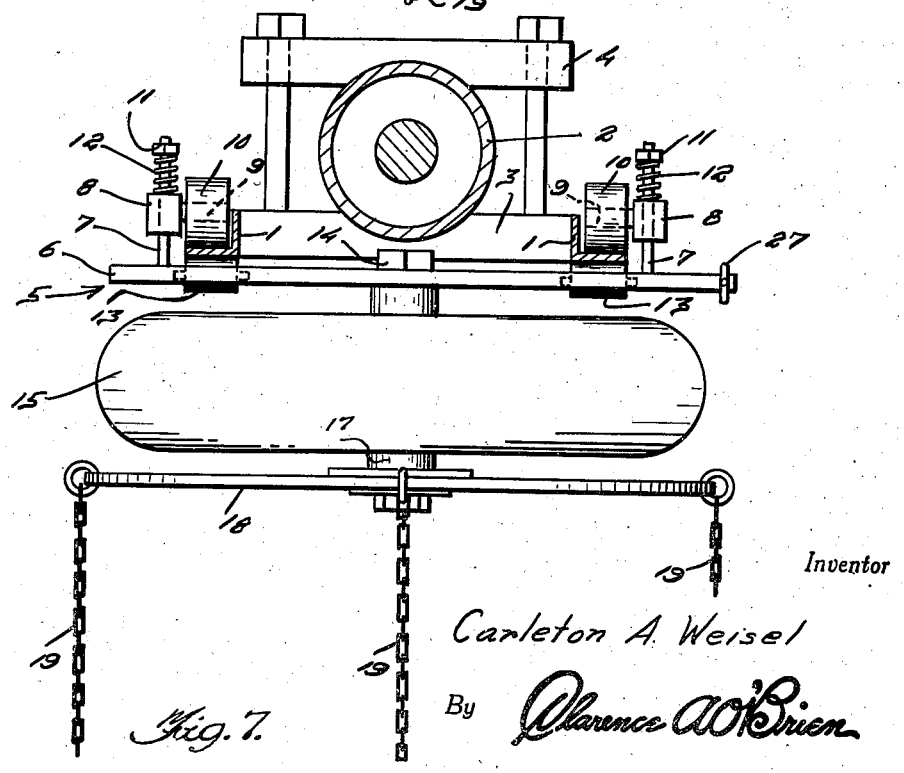
Figure 7 is a cross sectional view through the tracks, the axle and the axle housing.
Figures 8, 9:
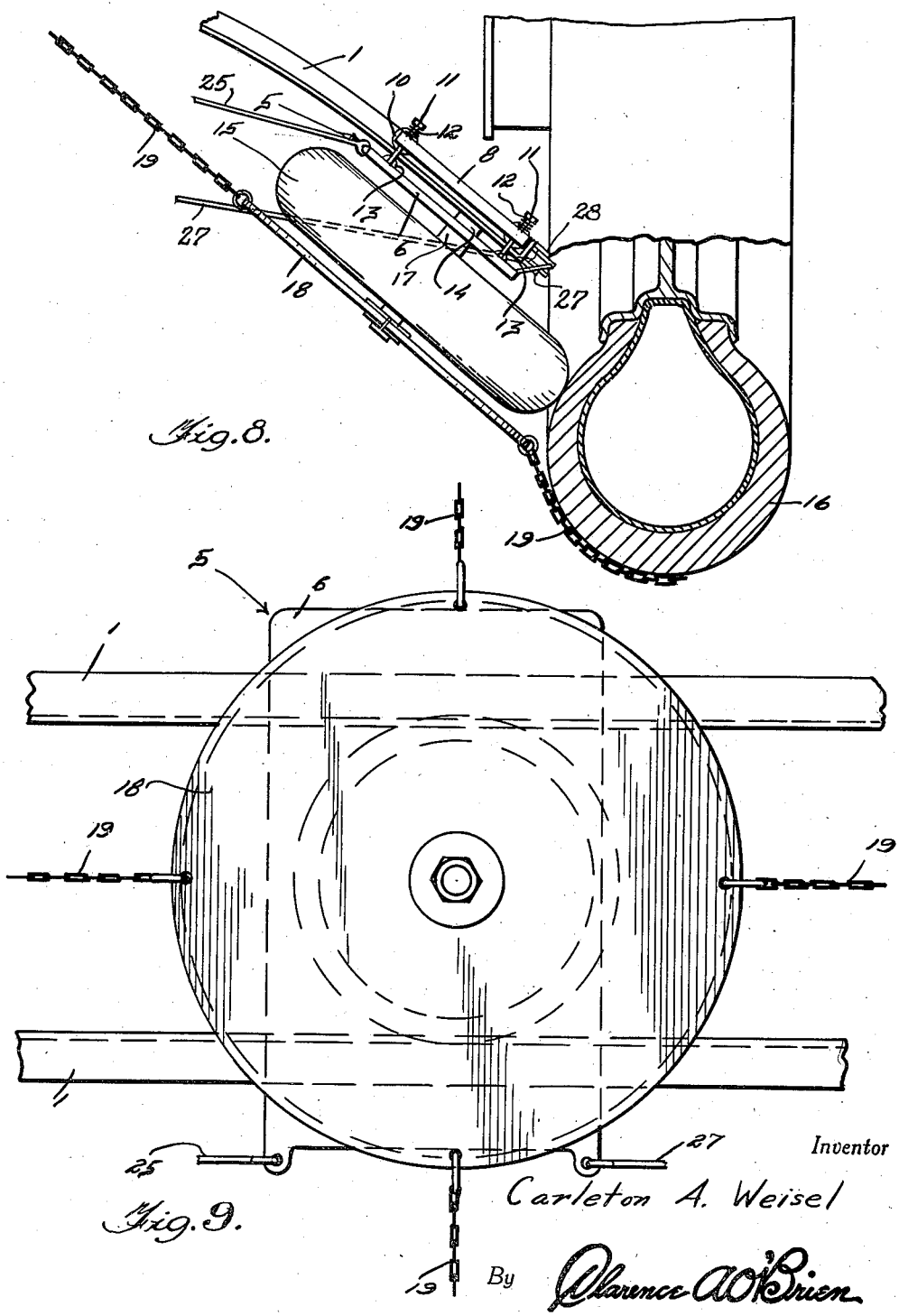
Figure 8 is a view in rear elevation of the device in operative position, showing the vehicle tire with which said device is engaged in cross section.
Figure 9 is a bottom plan view of the device.

Referring now to the drawings in detail, it will be seen that the embodiment of the invention which has been illustrated comprises pairs of angle iron tracks 1 which are mounted longitudinally beneath the axle housings 2 of a motor vehicle. It will be observed that the tracks 1 curve downwardly toward their outer ends. The tracks 1 are firmly secured in position beneath the axle housings 2 by means including metallic frame structures 3 and clamps 4.

Mounted for operation on the pairs of tracks 1 are carriages which are designated generally by the reference numeral 5. The carriages 5 include substantially rectangular plates 6 from the corner portions of which posts 7 rise. Slidably mounted on the pairs of posts 7 on each side portion of the plate 6 are bars 8. Projecting inwardly from the bars 8 are spindles 9 on which rollers 10 are journaled. The rollers 10 travel on the angle iron tracks 1. Threaded for adjustment on the upper end portions of the posts 7 are nuts 11. Coil springs 12 are provided on the posts 7 between the bars 8 and the nuts 11. Thus, the plate 6 is yieldingly supported on the bars 8. Journaled on the plate 6 are comparatively small rollers 13 which travel beneath the tracks 1. The coil springs 12 yieldingly draw the rollers 10 and 13 toward each other with the tracks 1 therebetween. The tension of the springs 12 may be adjusted as desired through the medium of the nuts 11.

Mounted on the plates 6 and depending therefrom are spindles 14. Pneumatic tire equipped wheels or pulleys 15 are journaled on the spindles 14. The wheels or pulleys 15 are engageable with the inner side walls of the rear vehicle tires 16 in a manner to be frictionally driven thereby when the vehicle is in motion. Fixed on the lower ends of the hubs 17 of the wheels 15 are disks 18. Mounted at spaced points on the periphery of the disks 18 are flexible traction elements in the form of chains 19 which are engageable by centrifugal force between the treads of the vehicle tires 16 and the ground.

The reference numeral 20 designates the drive shaft housing of the vehicle which is connected, at its rear end, to the differential housing 21. Mounted above and below the drive shaft housing 20 is a pair of suction cylinders 22 and 23. Extending slidably into the cylinders 22 and 23 through the rear ends thereof are rods 24 having pistons (not shown) on their forward ends operable in said cylinders 22 and 23. Suitable cables or the like 25 operatively connect the upper cylinder 22 to the carriages 5 for retracting said carriages. The cables 25 are trained over pulleys 26 which, in the arrangement shown, are mounted on the differential housing 21. The lower vacuum cylinder 23 is operatively connected by cables 27 to the carriages 5 for moving said carriages to operative position. The cables 27 are trained over suitably arranged pulleys 28.

A control valve 29 is provided for the vacuum cylinders 22 and 23. Pipes 30 and 31 have one end conected, respectively, to the forward ends of the cylinders 22 and 23 and their other ends connected to diametrically opposite sides of the casing 32 of the valve 29. A suction pipe 33 connects the valve casing 32 with the intake manifold of the vehicle engine. A vent port 34 is provided in the valve casing 32 at a point diametrically opposite the vacuum pipe 33. The core or plug 35 of the valve 29 has formed therein circumferential passages 36 through the medium of which either of the pipes 30 and 31 may be brought into communication with the suction pipe 33 while the other of said pipes 30 and 31 is brought into communication with the vent 34. In Figure 3 of the drawings, the valve 29 is shown in closed position.

In operation, when it is desired to use the device the valve 29 is set to connect the pipe 31 with the pipe 33. Thus, the piston in the lower cylinder 23 is drawn forwardly and the carriages 5 are moved outwardly and downwardly on the tracks 1 by the cables 27. This adjustment of the valve 29 establishes communication between the pipe 30 and the vent 34. This permits the piston in the upper cylinder 22 to move rearwardly freely for paying out the cables 25 when the carriages 5 move outwardly. When the carriages 5 are moved to their outer positions the tires on the wheels 15 engage the inner side walls of the rear vehicle tires 16 and are frictionally driven thereby. In this manner the disks 18 are rotated and the traction chains 19 are swung outwardly by centrifugal force in a manner to be caught between the treads of the vehicle tires 16 and the ground or highway. It will be noted that the wheels 15 and the disks 18 are in an inclined position when the carriages 5 are on the outer end portions of the tracks 1. When it is desired to render the antiskid devices inoperative, the valve 29 is set to connect the upper cylinder 22 with the intake manifold of the engine for retracting the carriages 5 on the tracks 1 through the medium of the cables 25.

It is believed that the many advantages of an antiskid device constructed in accordance with the present invention will be readily understood and although a preferred embodiment of the apparatus is as illustrated and described, it is to be understood that changes in the details of construction and in the combination and arrangement of parts may be resorted to which will fall within the scope of the invention as claimed.

What is claimed is:

1. An antiskid device comprising tracks mounted on a wheel supported vehicle, a wheel operable on said tracks and engageable with one of the vehicle wheels for actuation thereby, and flexible traction elements mounted on the second named wheel and engageable beneath the vehicle wheel when the vehicle is in motion.

2. An antiskid device for motor vehicles comprising tracks mounted on the vehicle, a carriage operable on said tracks, a wheel journaled on said carriage and engageable with one of the vehicle wheels for actuation thereby when the vehicle is in motion, and flexible traction elements mounted on the first named wheel and engageable beneath the vehicle wheel.

3. An antiskid device for motor vehicles comprising tracks mounted on the vehicle, a carriage operable on said tracks, a wheel journaled on the carriage and engageable with one of the vehicle wheels for actuation thereby, a disk mounted on the first named wheel, flexible traction elements mounted on said disk and engageable beneath the vehicle wheel when the vehicle is in motion, and means for moving the first named wheel into and out of engagement with the vehicle wheel.

4. An antiskid device for motor vehicles comprising a carriage slidable on the vehicle, a wheel journaled on said carriage and engageable with a wheel of the vehicle for actuation thereby, traction elements on the first named wheel engageable beneath said vehicle wheel when the vehicle is in motion, and pneumatic means for engaging the first named wheel with the vehicle wheel and for disengaging said first named wheel from said vehicle wheel.

5. An antiskid device for motor vehicles comprising a pair of tracks mounted on the vehicle, a carriage operable on said tracks, a wheel journaled on said carriage, a disk mounted on said wheel, flexible traction elements mounted on the peripheral portion of said disk, pneumatic means for shifting the carriage for engaging the wheel with a wheel of the vehicle, pneumatic means for shifting the carriage for disengaging the first named wheel from the vehicle wheel, the traction elements being engageable beneath the vehicle wheel, and means for controlling said pneumatic means.

6. An antiskid device for motor vehicles comprising a pair of tracks, means for securing said tracks beneath an axle housing of the vehicle, the outer portions of the tracks extending downwardly from the axle housing, a carriage operable on the tracks, said carriage including a plate, posts rising from the plate, rollers rotatably and slidably mounted on said posts and operable on top of the tracks, rollers journaled on the plate and operable on the lower sides of the tracks, a wheel journaled on the carriage and frictionally engageable with a wheel of the vehicle for actuation thereby, a disk fixed to the first named wheel, flexible traction elements mounted on the disk and engageable beneath the vehicle wheel when the vehicle is in motion, means for shifting the carriage for engaging the first named wheel with the vehicle wheel, and means for shifting the carriage for disengaging said first named wheel from said vehicle wheel.

CARLETON A. WEISEL.